(12) United States Patent
Hsieh

(10) Patent No.: US 6,513,768 B1
(45) Date of Patent: Feb. 4, 2003

(54) LOCK FOR A GUITAR STAND

(76) Inventor: Wu-Hong Hsieh, No. 162, Chung Shan 2nd Rd., Lu Chou City, Taipei Hsien (TW)

( * ) Notice: Subject to any disclaimer, the term of this patent is extended or adjusted under 35 U.S.C. 154(b) by 0 days.

(21) Appl. No.: 10/056,032

(22) Filed: Jan. 28, 2002

(51) Int. Cl.[7] .................................................. F16L 3/00
(52) U.S. Cl. ....................................... 248/121; 248/443
(58) Field of Search ............................. 248/121, 125.2, 248/125.7, 441.1, 443, 452, 113; 84/327

(56) References Cited

U.S. PATENT DOCUMENTS

| | | | | |
|---|---|---|---|---|
| 5,372,346 A | * | 12/1994 | Upchurch et al. | 248/222.52 |
| 5,664,756 A | * | 9/1997 | Liao | 248/443 |
| 5,744,735 A | * | 4/1998 | Liao | 224/910 |
| 6,005,176 A | * | 12/1999 | Yu | 248/443 |
| 6,036,159 A | * | 3/2000 | Yu | 224/910 |
| 6,439,532 B1 | * | 8/2002 | Yu | 248/122.1 |

* cited by examiner

Primary Examiner—Ramon O. Ramirez
Assistant Examiner—Kofi Schulterbrandt
(74) Attorney, Agent, or Firm—Rosenberg, Klein & Lee

(57) ABSTRACT

A lock for a guitar stand includes a connecting housing (10), a locking housing (20), two arms (201), two lips (23) and a resilient element (21). The locking housing (20) is movably connected to the connecting housing (10). Each of the two arms (201) extends from opposite ends of the locking housing (20) and a passage (202) is defined in each arm (201) to rotatably receive a shaft (22). Each lip (23) securely connected perpendicular to one free end of the shaft (22). The resilient element (21) is compressibly mounted in the locking housing (20) between an inner face of the locking housing (20) and a base rod (12) extending out from the connecting housing (10) to provide a recovery force to the locking housing (20) to return the locking housing (20) to its original position.

17 Claims, 5 Drawing Sheets

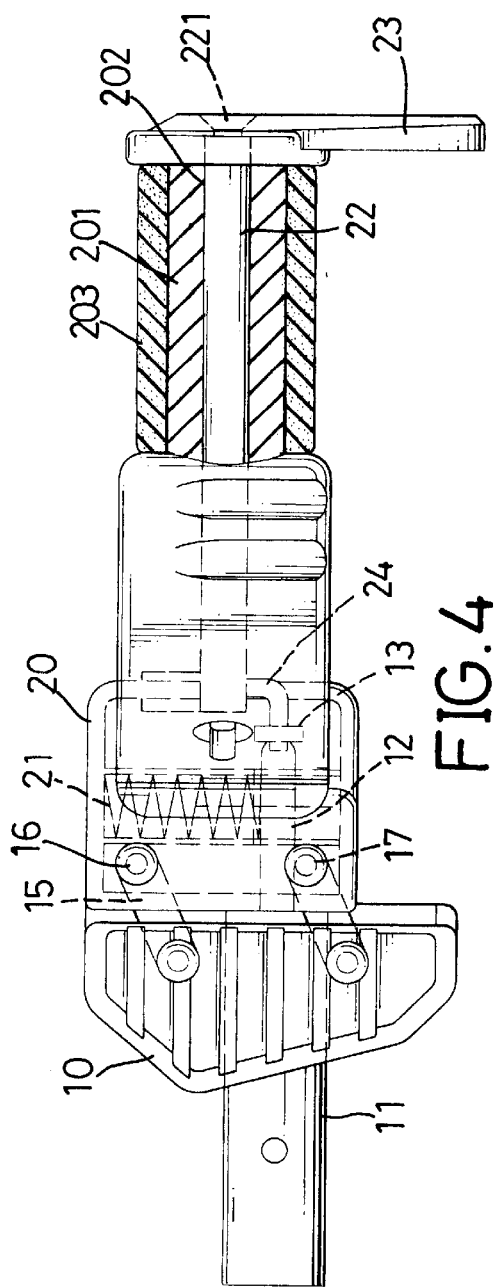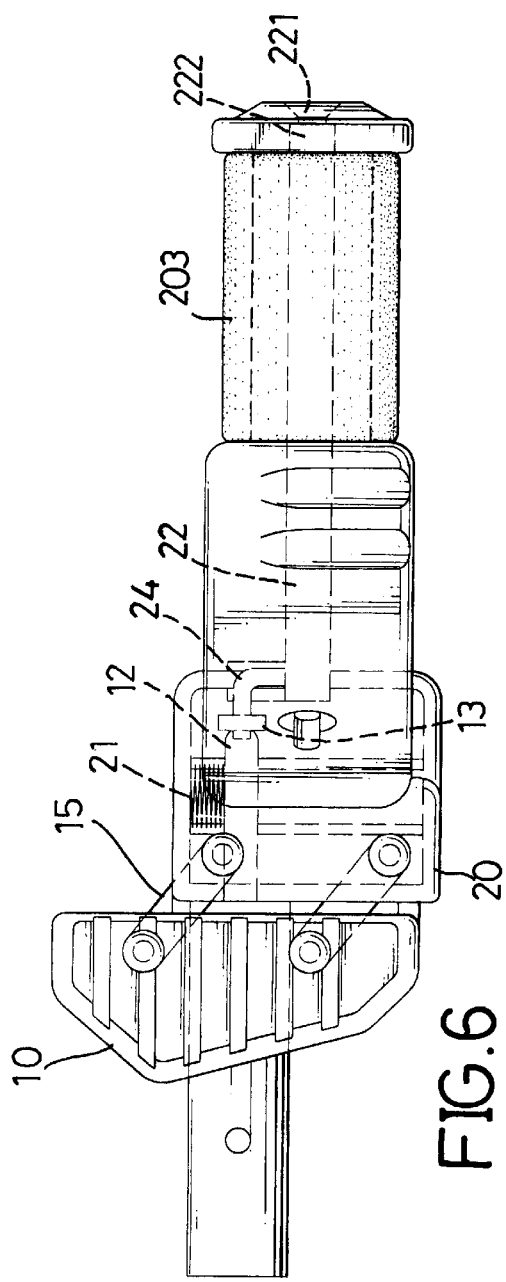

LOCK FOR A GUITAR STAND

BACKGROUND OF THE INVENTION

1. Field of the Invention

The present invention relates to a lock, and more particularly to a lock for a guitar stand. The lock has two lips pivotally movable to each other, such that when a guitar is positioned between the two lips, the lips are able to pivot toward each to keep the guitar from being removed from the stand.

2. Description of Related Art

When a guitarist is taking a break, the guitarist normally places the guitar upright against an object such as a wall to keep anyone from stepping on the guitar. However, when the guitar is placed randomly against an object, the guitar can easily fall or be knocked over and be damaged. To protect guitars, an instrument stand with a U-shaped head was developed, which allows the guitarist to place the neck of the guitar in the U-shaped head. However, there is still no retaining device to securely hold the guitar inside the head. With such a stand, the guitar is easily knocked or dislodged from the stand and damaged. Therefore, manufacturers developed a U-shaped head for an instrument stand with a retaining plate selectively pivotal to close the opening in the U-shaped head of the instrument stand to hold the guitar inside the opening in the head. Again, this kind of structure requires the user specifically close the retaining plate, which is quite troublesome and sometimes when the user forgets to close the retaining plate, the guitar still easily falls from the instrument stand if it is bumped.

To overcome the shortcomings, the present invention intends to provide an improved lock for a guitar stand to mitigate or obviate the aforementioned problems.

SUMMARY OF THE INVENTION

The primary objective of the invention is to provide a lock for a guitar stand to hold the guitar in the stand.

To accomplish the foregoing objective, the lock has two lips pivotal with respect to each other, a locking housing to which the lips are securely engaged and a connecting housing movably connected to the locking housing. When the locking housing moves with respect to the connecting housing, the lips move toward each other so that a guitar leaning against the lock is able to be secured inside the lips.

Other objects, advantages and novel features of the invention will become more apparent from the following detailed description when taken in conjunction with the accompanying drawings.

BRIEF DESCRIPTION TO THE ACCOMPANYING DRAWINGS

FIG. 4 is a side plan view in partial section of the lock in FIG. 3;

Figure 5:
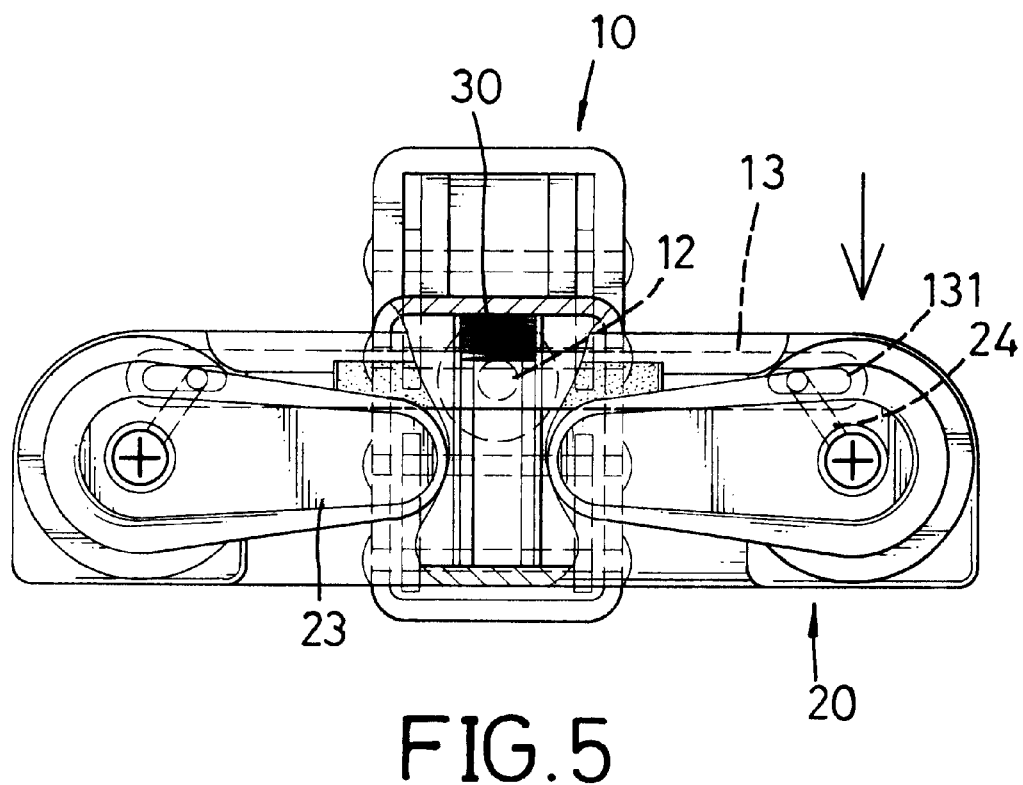
FIG. 5 is an operational front plan view in partial section of the lock in FIG. 1 with the lips closed.

FIG. 6 s a side plan view in partial section of the lock in FIG. 5; and

Figure 1:
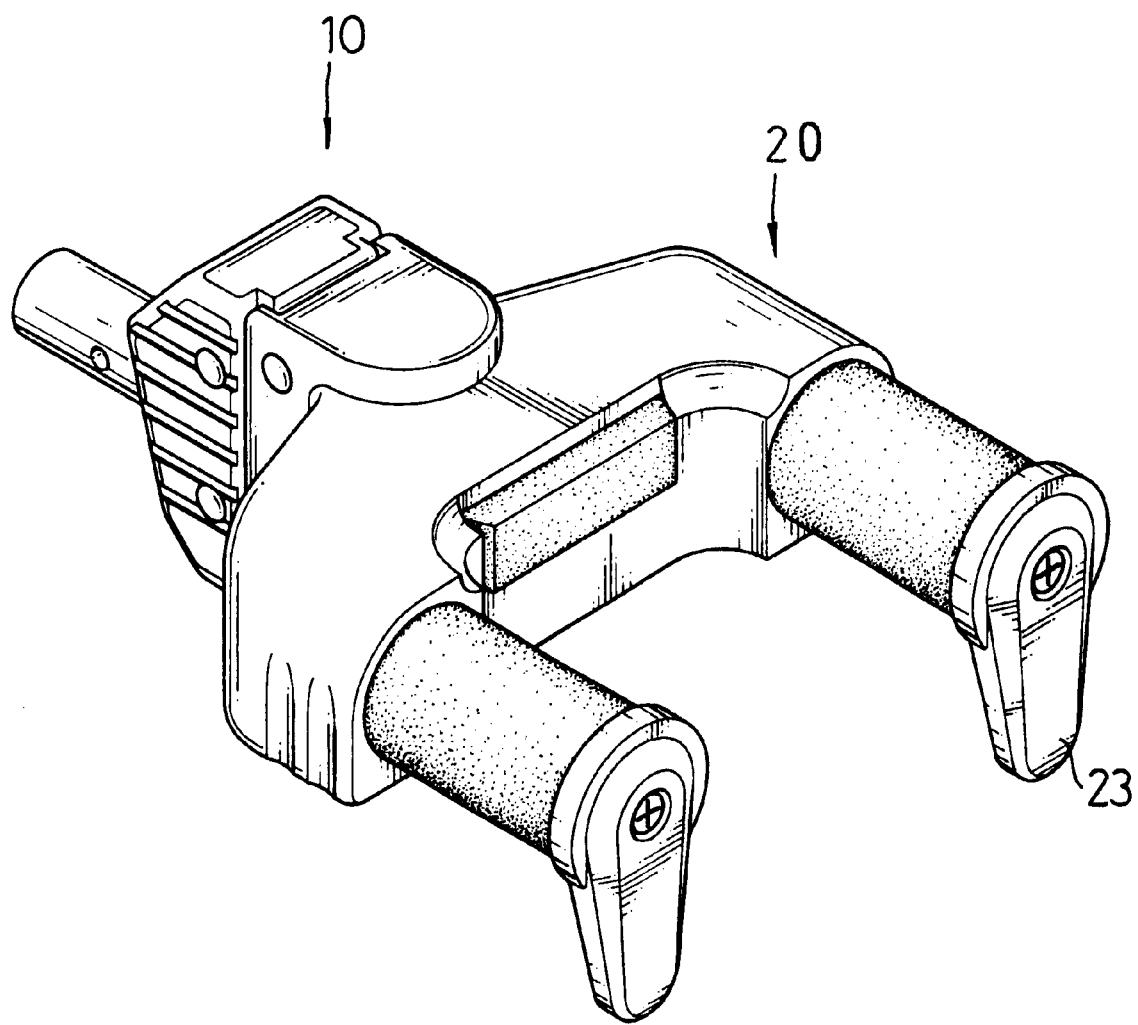
FIG. 1 is a perspective view of the lock for a guitar stand in accordance with the present invention.
Figure 7:
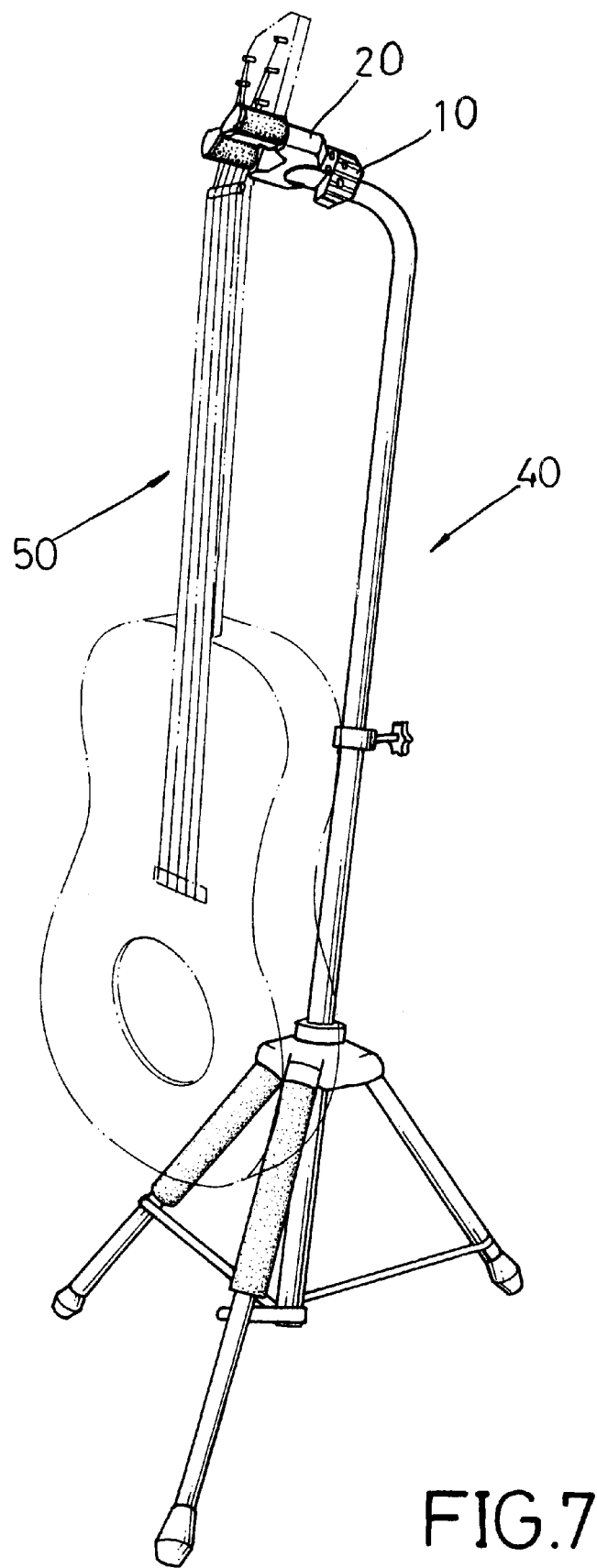

FIG. 7 is a perspective view of the lock in FIG. 1 on an instrument stand used to secure a guitar in the stand.

DETAILED DESCRIPTION OF THE PREFERRED EMBODIMENT

Figure 2:
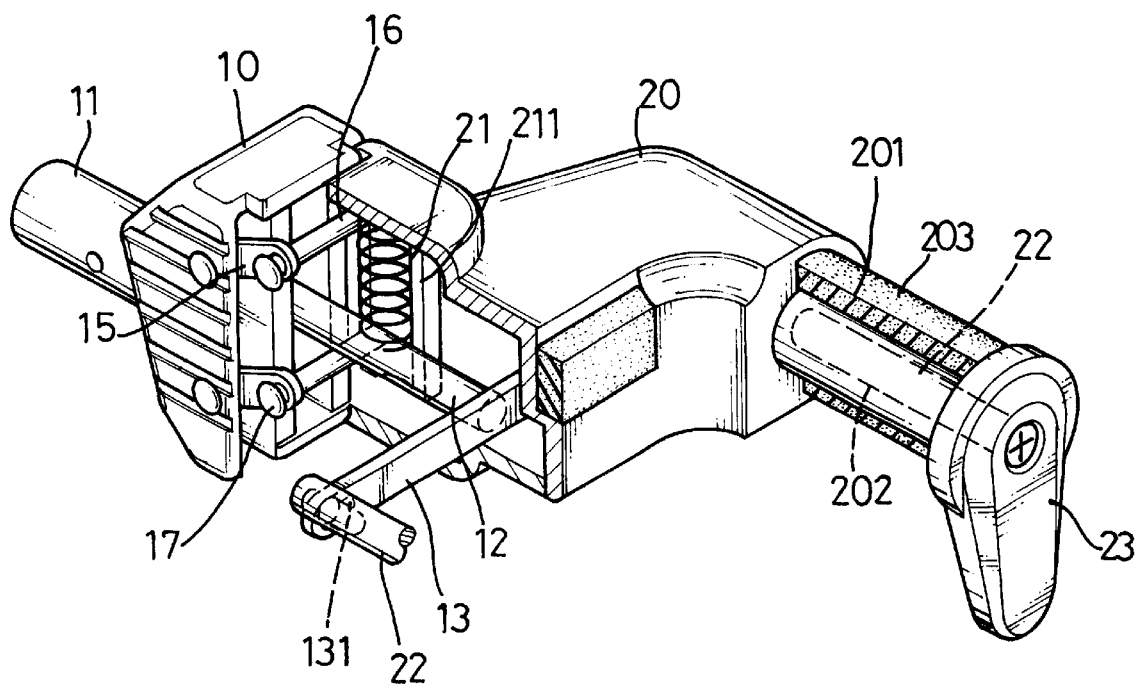
FIG. 2 is a perspective view in partial section of the lock in FIG. 1.

With reference to FIGS. 1 and 2, the lock for a guitar stand in accordance with the present invention has a connecting housing (10) and a locking housing (20) movably connected to the connecting housing (10).

The connecting housing (10) includes a stud (11) integrally extending out from a side of the connecting housing (10) for connecting to an object such as a stand or a wall. A base rod (12), opposite from the stud (11), integrally extends out of the connecting housing (10). A cross bar (13) securely attaches to the free end of the base rod (12) and has an elongated opening (131) defined in both free ends of the cross bar (13). A pair of connecting plates (15) is pivotally attached to opposite sides of the connecting housing (10) and each connecting plate (15) extends out from an edge of the connecting housing (10). A first rod (16) and a second rod (17) are transversely and pivotally connected to free ends of corresponding connecting plates (15), such that the two pairs of connecting plates (15) are able to move simultaneously.

The locking housing (20) movably engages and communicates with the connecting housing (10). A channel (211) is defined in the locking housing (20) in which a resilient element (21), such as a spring is mounted. The resilient element (21) compressibly mounted between an inner face of the locking housing (20) and a periphery of the base rod (12). When the locking housing (20) moves relative to the connecting housing (10), which drives the pair of connecting plates (15) to move simultaneously, the resilient element (21) provides the recovery force to return the locking housing (20) to its original position. The locking housing (20) further has two arms (201) horizontally extending from opposite ends of the locking housing (20), and a passage (202) is defined in each of the arms (201) to rotatably receive therein a shaft (22).

Figure 3:
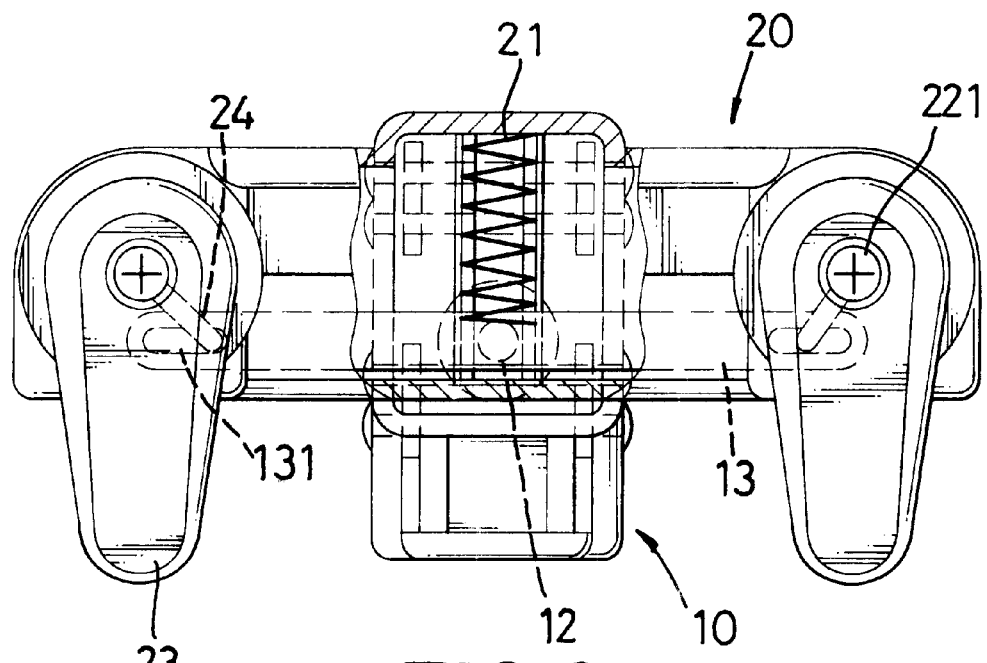
FIG. 3 is a front plan view in partial section of the lock in FIG. 1 with the lips open.

With further reference to FIG. 3, the shaft (22) is connected to each free end of the cross bar (13) by a connecting bar (24) with two ends. One end of the connecting bar (24) is securely connected to the shaft (22), and the other end is snugly received in the elongated opening (131) of the cross bar (13). With further reference to FIG. 4, the connecting bar (24) is bent 90° so that when the locking housing (20) moves with respect to the connecting housing (10), the limitation of the connecting bar (24) in the elongated opening (131) causes the shafts (22) to rotate.

A rubber cushion (203) is mounted on the outer periphery of the arm (201) so the guitar is protected from marring, chaffing or other damage when it leans against the arm (201).

A lip (23) is securely attached to the free ends of each shaft (22) such that the lip (23) is vertical with respect to the corresponding shaft (22).

With respect to FIGS. 1, 3 and 4, when the lock is not in use, the resilient element (21) presses against the inner face of the locking housing (20) and the periphery of the base rod (12) and holds the locking housing (20) still relative to the connecting housing (10) such that the two lips (23) are directly facing downward.

With reference to FIGS. 5 and 6, when the neck of the guitar is placed between the two arms (201), the weight of the guitar forces the locking housing (20) to move downward relative to the connecting housing (10). This downward movement of the locking housing causes the two shafts

(22) to rotate. When the two shafts (22) rotate, the two lips (23) simultaneously rotate toward each other. After the movement of the lips (23), the guitar placed on the two arms (201) is thus securely held between the two arms (201) by the two lips (23).

To remove the guitar from the arms (201), the guitar is simply lifted so the resilient element (21) presses the locking housing (20) up with respect to the connecting housing (10), which causes the shafts (22) and lips (23) to rotate and open the space between the arms (201).

It is to be noted from FIG. 7 that the stud (11) extending from the connecting housing (10) is able to attach to a stand (40) of any kind or to a wall such that the guitar (50) is able to be placed between the two arms (201).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the fill extent indicated by the broad general meaning of the terms in which the appended claims are expressed.

What is claimed is:

1. A lock for a guitar stand, the lock comprising:

a connecting housing adapted to attach to a guitar stand;

a locking housing movably connected to the connecting housing and having two shafts horizontally and rotatably extending out from the locking housing, each shaft having a lip securely connected perpendicular to one free end of the shaft; and a stud extending out from the connecting housing to adapt to securely attach to the guitar stand, whereby a weight applied to the two shafts forces the locking housing to move relative to the connecting housing and thus forces the shafts to rotate so that the lips move toward each other to hold the guitar inside the lips.

2. The lock as claimed in claim 1 further comprising pairs of connecting plates each pivotally engaged with the connecting housing and extending out from an edge of the connecting housing to be pivotally and transversely engaged with rods.

3. The lock as claimed in claim 2 further comprising a base rod integrally extending out from the connecting housing opposite to the stud, a cross bar securely attached perpendicular to the base rod, and two arms each extending out from the locking housing and a passage defined in each arm to rotatably receive the shaft.

4. The lock as claimed in claim 3 further comprising two connecting bars each connected between a free end of the cross bar and the other free end of the shaft.

5. The lock as claimed in claim 4, wherein the connecting bar is bent 90 degrees.

6. The lock as claimed in claim 4, wherein each of the free ends of the cross bar has an elongated opening defined to snugly receive one end of the connecting bar, the other end of the connecting bar is securely engaged with the shaft.

7. The lock as claimed in claim 1, wherein the locking housing further has a channel defined to receive a resilient element mounted between an inner face of the locking housing and a periphery of the base rod so as that the resilient element is able to provide a recovery force to the locking housing after the locking housing moves relative to the connecting housing.

8. The lock as claimed in claim 2, wherein the locking housing further has a channel defined to receive a resilient element mounted between an inner face of the locking housing and a periphery of the base rod so as that the resilient element is able to provide a recovery force to the locking housing after the locking housing moves relative to the connecting housing.

9. The lock as claimed in claim 3, wherein the locking housing further has a channel defined to receive a resilient element mounted between an inner face of the locking housing and a periphery of the base rod so as that the resilient element is able to provide a recovery force to the locking housing after the locking housing moves relative to the connecting housing.

10. The lock as claimed in claim 4, wherein the locking housing further has a channel defined to receive a resilient element mounted between an inner face of the locking housing and a periphery of the base rod so as that the resilient element is able to provide a recovery force to the locking housing after the locking housing moves relative to the connecting housing.

11. The lock as claimed in claim 5, wherein the locking housing further has a channel defined to receive a resilient element mounted between an inner face of the locking housing and a periphery of the base rod so as that the resilient element is able to provide a recovery force to the locking housing after the locking housing moves relative to the connecting housing.

12. The lock as claimed in claim 6, wherein the locking housing further has a channel defined to receive a resilient element mounted between an inner face of the locking housing and a periphery of the base rod so as that the resilient element is able to provide a recovery force to the locking housing after the locking housing moves relative to the connecting housing.

13. The lock as claimed in claim 3 further comprising a rubber cushion provided around the arm so that a guitar placed on the arms is protected from damage.

14. The lock as claimed in claim 4 further comprising a rubber cushion provided around the arm so that a guitar placed on the arms is protected from damage.

15. The lock as claimed in claim 5 further comprising a rubber cushion provided around the arm so that a guitar placed on the arms is protected from damage.

16. The lock as claimed in claim 6 further comprising a rubber cushion provided around the arm so that a guitar placed on the arms is protected from damage.

17. The lock as claimed in claim 7 further comprising a rubber cushion provided around the arm so that a guitar placed on the arms is protected from damage.

* * * * *